US 9,383,213 B2

(12) United States Patent
Rieth et al.

(10) Patent No.: US 9,383,213 B2
(45) Date of Patent: Jul. 5, 2016

(54) UPDATE OF DIGITAL MAPS AND POSITION-FINDING

(75) Inventors: Peter Rieth, Eltville (DE); Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 394 days.

(21) Appl. No.: 12/673,697

(22) PCT Filed: Apr. 23, 2008

(86) PCT No.: PCT/EP2008/054945
§ 371 (c)(1),
(2), (4) Date: Feb. 16, 2010

(87) PCT Pub. No.: WO2009/027123
PCT Pub. Date: Mar. 5, 2009

(65) Prior Publication Data
US 2011/0022246 A1    Jan. 27, 2011

(30) Foreign Application Priority Data

Aug. 25, 2007 (DE) .......................... 10 2007 040 189
Aug. 29, 2007 (DE) .......................... 10 2007 040 979
Feb. 27, 2008 (DE) .......................... 10 2008 011 001

(51) Int. Cl.
*G01C 21/00* (2006.01)
*G01C 21/32* (2006.01)
*G08G 1/0969* (2006.01)

(52) U.S. Cl.
CPC .............. *G01C 21/32* (2013.01); *G08G 1/0969* (2013.01)

(58) Field of Classification Search
CPC ..................................................... G01C 21/00
USPC ............................. 701/1, 409, 450, 462, 532
See application file for complete search history.

(56) References Cited

U.S. PATENT DOCUMENTS

| 5,774,824 | A | 6/1998 | Streit et al. |
| 5,941,930 | A * | 8/1999 | Morimoto et al. ............ 701/201 |
| 5,948,043 | A | 9/1999 | Mathis |
| 6,023,653 | A | 2/2000 | Ichimura et al. |
| 6,075,467 | A | 6/2000 | Ninagawa |
| 6,405,128 | B1 * | 6/2002 | Bechtolsheim et al. ...... 701/431 |
| 6,735,515 | B2 * | 5/2004 | Bechtolsheim et al. ...... 701/208 |

(Continued)

FOREIGN PATENT DOCUMENTS

| DE | 199 16 967 | 11/2000 |
| DE | 103 22 559 | 12/2004 |

(Continued)

OTHER PUBLICATIONS

International Search Report for PCT/EP2008/054945 dated Apr. 12, 2008.

(Continued)

*Primary Examiner* — Truc M Do
(74) *Attorney, Agent, or Firm* — RatnerPrestia

(57) ABSTRACT

A control system for a vehicle which has a first controller for storing navigation map data and a separate second controller for storing update data. The navigation map data are updated outside of the first controller. The first controller or at least the navigation system is designed to perform map matching and to ascertain a possible location area for the vehicle on the basis of an evaluation of a travel history for a travel angle, or other measurement data which characterize the movement or the location of the vehicle.

19 Claims, 3 Drawing Sheets

(56) References Cited

U.S. PATENT DOCUMENTS

| | | | |
|---|---|---|---|
| 7,577,515 B2* | 8/2009 | Nomura | 701/200 |
| 2001/0001763 A1* | 5/2001 | Ito | 455/512 |
| 2002/0013659 A1* | 1/2002 | Kusama | 701/211 |
| 2002/0193944 A1 | 12/2002 | Stewenius | |
| 2003/0144792 A1* | 7/2003 | Amano et al. | 701/207 |
| 2003/0229441 A1 | 12/2003 | Pechatnikov et al. | |
| 2004/0220728 A1* | 11/2004 | Cayford | 701/209 |
| 2004/0236498 A1 | 11/2004 | Le et al. | |
| 2005/0033510 A1* | 2/2005 | Kawaguchi et al. | 701/209 |
| 2005/0114019 A1* | 5/2005 | Umezu et al. | 701/210 |
| 2006/0149467 A1* | 7/2006 | Nakayama et al. | 701/211 |
| 2006/0293845 A1* | 12/2006 | Watanabe | 701/208 |
| 2007/0106463 A1* | 5/2007 | Nomura | 701/208 |
| 2007/0182588 A1 | 8/2007 | Yanase | |
| 2007/0198184 A1* | 8/2007 | Yoshioka et al. | 701/211 |
| 2008/0109157 A1* | 5/2008 | Ishikawa et al. | 701/207 |
| 2008/0242312 A1* | 10/2008 | Paulson et al. | 455/456.1 |

FOREIGN PATENT DOCUMENTS

| | | |
|---|---|---|
| DE | 10 2005 008 185 | 8/2006 |
| JP | 11 006739 | 1/1999 |
| JP | 2005 331278 | 12/2005 |
| WO | WO 02/39063 | 5/2002 |

OTHER PUBLICATIONS

German Search Report for DE 10 2008 011 001.9 dated Jan. 21, 2009.

* cited by examiner

UPDATE OF DIGITAL MAPS AND POSITION-FINDING

CROSS REFERENCE TO RELATED APPLICATIONS

This application is the U.S. national phase application of PCT International Application No. PCT/EP2008/054945, filed Apr. 23, 2008, which claims priority to German Patent Application No. DE 10 2007 040 189.4, filed Aug. 25, 2007, German Patent Application No. DE 10 2007 040 979.8, filed Aug. 29, 2007, and German Patent Application No. 10 2008 011 001.9, filed Feb. 27, 2008, the contents of such applications being incorporated herein by reference.

FIELD OF THE INVENTION

The invention relates to navigation technology for vehicles. In particular, the invention relates to a control system for a vehicle, a method for updating a digital map, the use of a control system for updating a digital map, the use of a control system for performing map matching, a computer program product and a computer-readable medium.

BACKGROUND OF THE INVENTION

The rapid increase in vehicle traffic on the roads and the associated queues and travel time extensions are resulting in increased efforts worldwide to identify traffic states and to take them into account for the route selection or for route calculation in navigation systems.

If the geographical coordinates measured using a position-finding method are mapped directly to the coordinate system of a digital map, the true position of the object in the map may differ from the mapped position of the object in the map. The reason for this may firstly be measurement errors in the position-finding method and secondly inaccuracies in the map.

Since a navigation system needs to know the true position in the map, the map matching method aligns the measured position with the map information about the position and geometry of objects in the map, so that the most probable position of the object in the map is ascertained.

In vehicle navigation systems, the position of the vehicle is usually measured with the assistance of the satellite position-finding system GPS. The correctness of the measured and actual positions is specified at approximately 15 m in the case of GPS. Similarly, the digital map may have tolerances in the region of meters. The navigation appliance then needs to ascertain the position of the vehicle in the digital map so that, by way of example, it is possible to determine a meaningful route calculation from the current location to the destination of travel. Without alignment of the measured position with the map information, the vehicle could find itself outside of the digitalized roads or on the wrong road in the map. Since the position of the vehicle in the digital map is critical for the navigation appliance, the measured position is aligned with the map information such that the most probable location of the vehicle in the map is ascertained for the navigation. In this regard, map matching involves utilizing the knowledge about the movements of the vehicle.

Digital maps are usually outdated as soon as they are delivered. For this reason, an update for the map is indispensable if the digital map is intended to correspond to the current circumstances. However, these updates comprise a large volume of data, since the whole map is always brought up to date.

SUMMARY OF THE INVENTION

It is an object of the invention to provide improved management of digital map data and update data. It is a further object of the invention to provide improved map matching.

The invention specifies a control system for a vehicle, a method for updating a digital map, the use of a control system for updating a digital map, the use of a control system for performing map matching, a computer program product and a computer-readable medium.

The exemplary embodiments described relate in equal measure to the control system, the method, the uses, the computer program product and to the computer-readable medium.

In line with one exemplary embodiment of the invention, a control system for a vehicle is specified which has a first controller for storing digital map data and a second controller for storing update data. The control system is designed to store the digital map data and the update data separately.

In other words, the digital maps, which are digital navigation maps, for example, and the update for navigation map data are kept separate.

The term "digital maps" should also be understood to mean maps for ADAS (Advanced Driver Assistance System), without any navigation taking place. One example is the "Map and Positioning Engine" MPE from Navteq.

The digital map data and the update for said digital map data are hosted on different controllers. The term host is intended in this context to be understood to mean installation and/or storage of the relevant data.

Since the digital map data involve relatively large volumes of data, the first controller has a correspondingly large memory. The update data, which are usually a much smaller volume of data, are stored in the second controller and sometimes relate only to a small portion of the digital map data. The update data are therefore kept or stored independently of the digital map data and can therefore also be installed and processed further independently thereof.

The map data can be updated outside of the first controller, e.g. within a driver assistance system or a navigation system. The map data in the first controller remain unaltered in this case, which increases the system safety, because the probability of damage to the map data stored in the first controller is reduced.

By way of example, the vehicle is a motor vehicle, such as a car, bus or heavy goods vehicle, or else is a rail vehicle, a ship, an aircraft, such as a helicopter or airplane, or is a bicycle, for example.

In line with a further exemplary embodiment of the invention, the first controller is in the form of a head unit which contains the navigation system, for example. By way of example, such a head unit is an apparatus which combines the operation of vehicle and infotainment components. The head unit allows central control of various onboard systems. By way of example, it is thus possible for the air-conditioning installation, the radio or optionally also the navigation system to be operated using the head unit.

A Bluetooth interface or another interface may be provided which allows simple communication with mobile telephones or PDAs to be performed. In this way, it is also possible to actuate mobile appliances using the head unit.

In line with a further exemplary embodiment of the invention, the first controller is in the form of a navigation system for the vehicle or is at least coupled to a navigation system for the vehicle.

Provided that the first controller is connected to a vehicle navigation system, the first controller can send the navigation system the digital map data or the navigation map data. The data transmission can be effected via a data cable or via a radio transmission link.

The navigation system can then update the digital map data or the navigation map data.

In line with a further exemplary embodiment of the invention, the navigation system is designed for navigation exclusively on the basis of the digital map data. There is no provision for the digital map data or the navigation map data based thereon to be updated. This allows the design of the navigation system to be simplified.

In line with a further exemplary embodiment of the invention, the second controller is in the form of a driver assistance system or is at least coupled to a driver assistance system.

In the first case, the digital map data can be updated in the second controller. In the second case, in which the driver assistance system is coupled to the second controller, the update can be performed in the driver assistance system.

In line with a further exemplary embodiment of the invention, the driver assistance system is designed to enhance or update the digital map data on the basis of the update data.

By way of example, provision may be made for the driver assistance system to retrieve the complete digital map data from the first controller and then to update and/or enhance said digital map data. The driver assistance system may also be designed to update only a particular area of the digital map and, for this purpose, also to accept only a particular portion of the digital map data from the first control system, for example. In this way, the volume of data to be transmitted can be reduced and the update speed can be increased.

In line with a further exemplary embodiment of the invention, the first controller is not designed to update the digital map data on the basis of the update data. It is not possible for the digital map data to be updated within the first controller. This means that it is possible to prevent the digital map data from being overwritten erroneously or from being damaged in another way during an update.

In line with a further exemplary embodiment of the invention, the navigation system is designed to enhance or update the digital map data on the basis of the update data. By way of example, it is thus possible for the digital map data to be enhanced or updated either by the driver assistance system or by the navigation system, depending on the application.

In line with a further exemplary embodiment of the invention, the first controller or at least the navigation system is designed to perform map matching and to ascertain a possible location area for the vehicle on the basis of an evaluation of a travel history.

Map matching can also be performed in the control center if only the GPS and history are available. In that case too, it is possible and advantageous to use probabilities and a plurality of possible positions, e.g. in the case of an eCall, which is an automatically sent emergency call by an electronic appliance in the vehicle.

In this context, the possible location area for the vehicle can be ascertained even if accurate map matching is not possible, because explicit association with a position in the map is not possible.

The effect achieved by this is that a plurality of precise location statements, particularly in emergency situations, can be output, even if safe or explicit map matching is not possible.

By way of example, in the event of insufficient reception of signals for the location information, map matching is performed by evaluating the travel history or other information, as illustrated in more detail later (such as angle, distance, . . . ), and this is then used to ascertain the possible location area for the vehicle. In this case, it is also possible for a plurality of possible location areas to be obtained which are physically separate from one another, depending on the local, geographical or structural circumstances of the area in question.

It should be borne in mind that the map matching and the ascertainment of the possible location area for the vehicle can also be performed by the second controller. In addition, this does not require the two controllers to be separate. On the contrary, the control system may also have just a single controller in this case.

In line with a further exemplary embodiment of the invention, the first controller or at least the navigation system is designed to ascertain a local location probability for the vehicle on the basis of the possible location area and to subsequently supplement a location information item.

The location area thus generates a local location probability, and the signals for the location information item are supplemented as appropriate.

In line with a further exemplary embodiment of the invention, the location information item is supplemented in the form of textual meta data.

In line with a further exemplary embodiment of the invention, the first controller or at least the navigation system is designed to transmit data for the location area or for the local location probability to a control center, even if explicit association with a permitted position on a navigation map is not possible.

In other words, the system is at all times able to send a control center or else other systems in the vehicle, e.g. ADAS, the possible, most probable positions of the vehicle. That is to say that even if exact map matching is not possible on account of an inaccurate measurement, e.g. on account of weak satellite signals or on account of failure of the GPS appliance, the control center is notified of the locations at which the vehicle might be. This makes it possible to reduce the size of the area in which a rescue service needs to search, for example.

In line with a further exemplary embodiment of the invention, the data transmitted to the control center contain information about a plurality of possible positions of the vehicle.

In line with a further exemplary embodiment of the invention, the information about the plurality of possible positions of the vehicle contains a statement indicating a location probability.

If three different possible location positions are ascertained, for example, then each individual position can be provided with the relevant location probability. These data are then transmitted together to the control center, so that the rescue service can gauge the areas in which intensified searching is required.

In line with a further exemplary embodiment of the invention, a method for updating a digital map is specified in which digital map data are stored in a first controller and update data are stored separately in a second controller.

In line with a further exemplary embodiment of the invention, the first controller is in the form of a navigation system for the vehicle or is at least coupled to a navigation system for the vehicle, and the second controller is in the form of a driver assistance system or is at least coupled to a driver assistance system.

In line with a further exemplary embodiment of the invention, the method also involves performance of map matching and ascertainment of a possible location area for the vehicle on the basis of an evaluation of a travel history by the first controller or at least the navigation system.

In line with a further exemplary embodiment of the invention, the use of a control system as described above for updating a digital map is specified.

In line with a further exemplary embodiment of the invention, the use of a control system as described above for performing map matching and for ascertaining a possible location area for the vehicle on the basis of an evaluation of a travel history, a travel angle, or other measurement data which characterize the movement or the location of the vehicle by the first controller or at least the navigation system is specified.

In line with a further exemplary embodiment of the invention, a computer program product is specified which, when executed on a processor, instructs the processor to perform the method steps indicated above.

In line with a further exemplary embodiment of the invention, a computer-readable medium is specified which stores a computer program product which, when executed on a processor, instructs the processor to perform the method steps indicated above.

A fundamental consideration of the invention is that of storing map data and update data on separate appliances. A further fundamental consideration of the invention is that of allowing a location area to be transmitted to a control center even if explicit association with a position by means of map matching is not possible. The invention can also be implemented without a control center, e.g. to the ADAS appliance in the case of ADAS.

BRIEF DESCRIPTION OF THE DRAWINGS

The invention is best understood from the following detailed description when read in connection with the accompanying drawings. Included in the drawings are the following figures.

Figure 1:
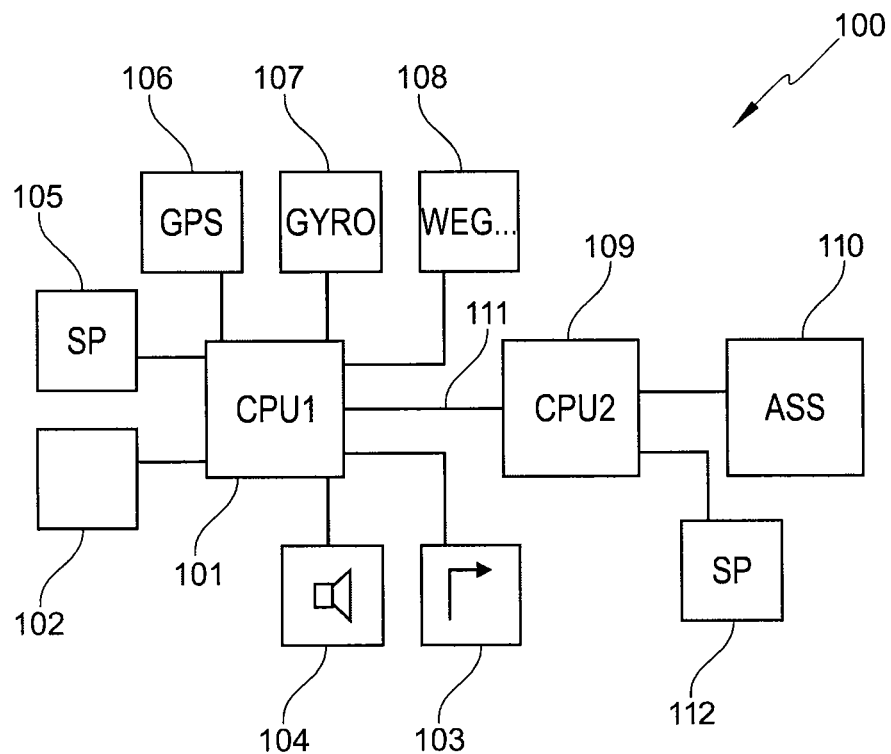
FIG. 1 shows a schematic illustration of a control system based on an exemplary embodiment of the invention.

The illustrations in the figures are schematic and not to scale.

DETAILED DESCRIPTION OF THE PREFERRED EMBODIMENTS

In the description of the figures which follows, the same reference numerals are used for the same or similar elements.

FIG. 1 shows a schematic illustration of components of a control system for a vehicle based on an exemplary embodiment of the invention. By way of example, the control system 100 is installed in a vehicle and is used for updating a digital navigation map. The control system 100 has a first controller 101, for example in the form of a first CPU, and a second controller 109, for example in the form of a second CPU.

The first controller 101 has an input unit 102 connected to it. The input unit 102 can be used to make various settings for the control system and to select a destination and possibly also a location for a navigation unit in the control system, for example. In this case, the destination can be input by inputting the complete name of the destination or else by selecting from a list which is shown on a visual output unit, such as a monitor 103. The monitor 103 is also used to output the routing information. Furthermore, the routing information can also be output by means of an audible output unit 104. The output by means of an audible output unit 104 has the advantage that the driver is less distracted from what is currently happening in the traffic. A memory element 105, which is connected to the central computation unit (first controller) 101 or is integrated in the first controller, stores the map data (navigation map data) in the form of data records. By way of example, the memory element 105 or 112 also stores additional information about traffic restrictions and the like in association with the data records.

The second controller 109 is connected to a driver assistance system 110 and obtains update data from the second memory element 112.

The two controllers 101, 109 are connected to one another by means of the line 111. It is also possible for a wireless link to be provided, possibly as an alternative to the line 111.

For the purpose of determining the current vehicle position, the control system 100 has a navigation unit 106 with a GPS receiver which is designed to receive navigation signals from GPS satellites. Naturally, the navigation unit 106 with the GPS receiver may also be designed for other satellite navigation systems.

Since the GPS signals cannot always be received in city-center areas, for example, the control system also has a direction sensor 107 and a distance sensor 108 and possibly also a steering wheel angle sensor for the purpose of performing compound navigation. Signals from the GPS receiver, from the distance sensor and from the direction sensor are handled in the central controller 101, for example. The vehicle position ascertained from said signals is aligned with the road maps using map matching. The route information obtained in this manner is finally output via the monitor 103.

The navigation map data are normally static and therefore quickly outdated. A plurality of mechanisms can be used to always keep these map data up to date. In line with the invention, map data and updates are kept separate. The static map data are used as a basis, and the changes are stored separately therefrom. It is therefore possible to accommodate map data and update data in separate controllers 101, 109 (or in associated memories 105, 112), e.g. map data in the head unit and update data in the controller for a driver assistance system.

As an alternative or in addition to the driver assistance system, it is also possible for a telematics control unit to be provided for communication with an external server, for example by means of GSM, UMTS, WiMax or WLAN. By way of example, a Telematics Control Unit (TCU) is a computer system having dedicated memories, dedicated bus systems, controllers for field buses and wireless networks, PC-compatible interfaces such as the USB interface or 1394, having A/D convertors, I/O interfaces and much more. TCU units are central components in onboard networks. They process the data which they obtain via the connected field buses, such as the CAN bus or the MOST bus, control the actuators and transmit the data to the driver assistance system, where they are displayed on the displays.

A driver assistance system requires the update and the map data in order to assist the driver in controlling the vehicle, for example in determining speed or setting the cornering light. Examples of a driver assistance system are traction control, such as ABS (Antilock Braking System), TCS (Traction Control System), ESP (Electronic Stability Program, may also contain traction control system) or EDL (Electronic Differential Lock). In addition, the driver assistance system may be provided for the purpose of controlling the light (adaptive cornering light, switching the headlights on and off, high beam assistant, night vision system, etc.). In addition or as an alternative, the driver assistance system may provide additional convenience and safety, for example by virtue of cruise control or adaptive cruise control ACC, a parking assistant, for example with ultrasound sensors for obstacle and distance recognition, a braking assistant, a distance alerter, etc.

The first controller 101 has a sufficiently large database 105 for storing the map data. The data store 112 of the second controller 109 may be designed to be correspondingly smaller in order to host just the update data.

By way of example, the navigation system 106 uses the "old" data and may therefore be designed to be simpler and less expensive, whereas the driver assistance system 110 also enhances the data from the navigation system with its update data. The controller with the map data does not need to be designed to change this large database, and the controller with the update data does not need to be able to store the large volumes of data from the map data.

A further advantage lies in the stability of the original map data. Since these are never altered, they cannot be put, by an erroneous update, into a state which makes it impossible to use them. Even in the worst case, only the update data are unusable and it is also possible to resort to the map data from the first controller, which, although old, work.

Figure 2:
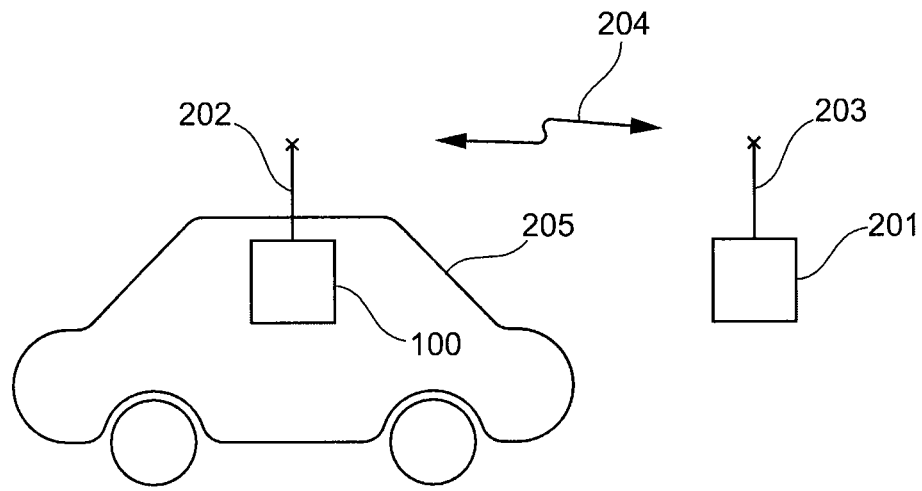
FIG. 2 shows a schematic illustration of an overall system based on an exemplary embodiment of the invention.

FIG. 2 shows a schematic illustration of an overall system based on an exemplary embodiment of the invention. The overall system has a control system 100 and also a control center or a server 201. The control system 100 and the control center 201 are coupled to one another by means of the radio modules 202 and 203 so as to be able to communicate. The communication between the two appliances 100, 201 takes place via a wireless transmission link 204.

The control system 100 is incorporated in a vehicle 205. The components 101, 102, 103, 104, 105, 106, (107) may be a mobile appliance which is in the car.

Figure 3:
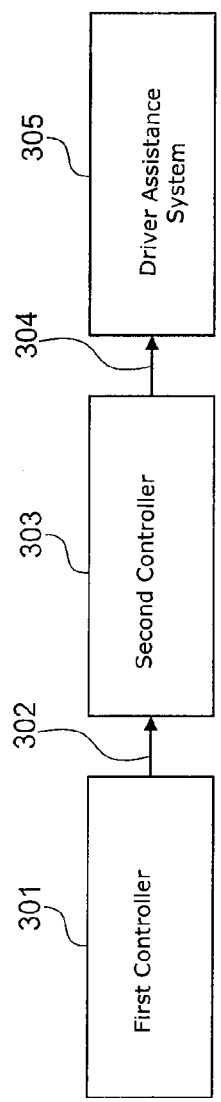
FIG. 3 shows the separation of the map data and the update for the map data (update data) in conjunction with the controllers based on an exemplary embodiment of the invention.

FIG. 3 shows the splitting of the map data and the update for said map data over different controllers. In this case, the map data are stored in the first controller (symbolized by unit 301) and are compared with the update data 303. This is symbolized by arrow 302. If necessary, an update is performed. The map data 301 and the update data 303 can be transferred together or separately to a navigation system and/or a driver assistance system 305. Next, a map matching algorithm or route planning is performed, for example. For the transfer of the data, what is known as an ADASIS interface 304 is provided, for example. The map data 301 and the driver assistance 305 can also run in the same unit. Coarse map matching is also already possible in the unit 301.

The transfer of the data to a navigation system or a driver assistance system 305 with an appropriate algorithm is symbolized by arrow 304.

What is critical is that update data and map data are kept and/or managed separately. This allows the computer performance to be increased and redundancy to be provided.

Figure 4:
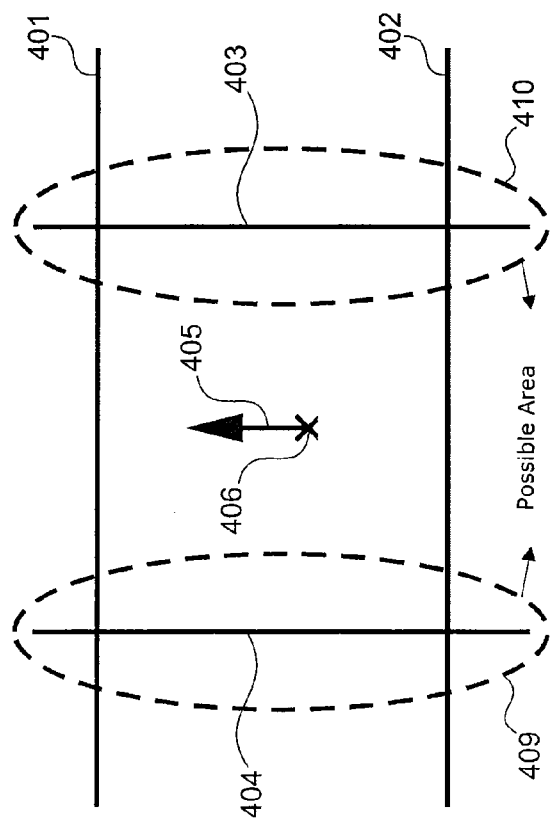
FIG. 4 shows details of possible location areas on the basis of an evaluation of the travel history based on an exemplary embodiment of the invention.

FIG. 4 shows a schematic illustration of possible areas on the basis of an evaluation of the travel history based on an exemplary embodiment of the invention. Various roads 401, 402, 403 and 404 are shown on which the vehicle can travel. In addition, a position 406 is shown which is obtained from a position measurement, including the history. This position is linked to a direction and speed arrow 405, which shows the direction and speed measured at present or in the recent past.

From the history information, in combination with the map information, it is possible to calculate possible probable location areas 409, 410 for the vehicle.

The aim of map matching is to take the combination of map material, current GPS position and GPS values from the recent past, for example in the region of seconds, and to ascertain the current position on the map and hence also the address or the position at which the appliance with map matching is located. The result can be improved in accordance with the invention if, by way of example, safe or explicit map matching is not possible. Such safe or explicit map matching may be impossible if the GPS appliance has just been switched on, for example. In this case, the measurements are often inaccurate. In addition, such safe or explicit map matching may be impossible if the signal reception is poor. In this case, it is often not possible to accurately determine whether the vehicle is located on the left-hand arm of the road or on the right-hand arm of the road after a road fork, for example.

In this case, it is necessary to output the possible area in which the vehicle might be. This is useful particularly in emergency situations if an explicit position is not possible on the basis of the GPS measurements. The ascertained area reduces the size of the region in which a rescue service needs to search, as indicated in FIG. 4.

When association between the position and a road is not explicit, information about the whereabouts is output. Hence, the location area for the vehicle is transmitted when explicit association with a position is not possible.

By way of example, the system calculates the number of possible areas in which the vehicle may be situated (409, 410). In this context, the calculation is performed on the basis of historical information and also map information and GPS information. The method may be geared towards taking account of the roads which are as close as possible to the measured position of the vehicle, in particular. In addition, the direction of travel or else the speed of the vehicle can also be included. It is also possible to evaluate past measurement data, such as information about the road on which the vehicle was on a short time ago. In addition, weighting factors can be introduced. By way of example, large roads can be assigned with a high degree of probability and small roads can be assigned with a lower degree of probability for the actual position of the vehicle.

The method is used particularly when the data sent by the vehicle need to be forwarded by a control computer at a rescue center or the like without there being a human in-between as an interpolator. The control system is provided with a plurality of selection options which are identified by means of whereabouts probabilities, for example. In reference to the example in FIG. 4, the data transmitted to the control computer may contain the information that the probability of the vehicle being in the area 409 is 40% and that the probability of the vehicle being in the area 410 is 60%, for example.

In this way, the brief to the rescue workers can be automated without the need for human interaction.

Figure 5:
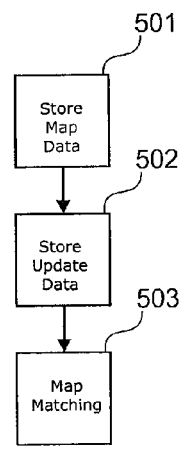
FIG. 5 shows a flowchart from a method based on an exemplary embodiment of the invention.

FIG. 5 shows a flowchart for a method based on an exemplary embodiment of the invention. In step 501, navigation map data are stored in a first controller; in step 502, update data are stored separately in a second controller, and in step 503, map matching and ascertainment of a possible location area for the vehicle on the basis of an evaluation of a travel history are performed by the first controller or at least the navigation system.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

The invention claimed is:

1. A control system in a vehicle, said control system comprising:
   a first controller including a first processor in the vehicle for storing navigation map data in a first storage memory device;
   a navigation monitor controlled by the first controller for displaying information to a driver of the vehicle; and
   a second controller connected to a vehicle data bus, the second controller including a second processor in the vehicle for storing update data in a second storage memory device separately from the navigation map data stored in the first storage memory device, and for receiving the navigation map data from the first processor of the first controller;
   wherein the second processor of the second controller:
      generates updated navigation map data based on the navigation map data received from the first processor of the first controller and the update data stored in the second storage memory device,
      stores the updated navigation map data separately from the navigation map data, and
      transmits the stored updated navigation map data to:
         1) a driver assistance system connected to the vehicle data bus and physically separate from the navigation monitor, where the updated navigation map data is used by the driver assistance system to control at least one of antilock braking system (ABS), electronic stability program (ESP), traction control system (TCS) and electronic differential lock (EDL), and
         2) the navigation monitor via the first controller.

2. The control system as claimed in claim 1, wherein the first controller is in the form of a head unit.

3. The control system as claimed in claim 1, wherein the second controller is in the form of a driver assistance system or is at least coupled to a driver assistance system.

4. The control system as claimed in claim 3, wherein the driver assistance system is designed to enhance or update the navigation map data on the basis of the update data.

5. The control system as claimed in claim 1, wherein the first controller does not update the navigation map data on the basis of the update data.

6. The control system as claimed in claim 1, wherein the first controller is in the form of a navigation system for the vehicle or is at least coupled to a navigation system for the vehicle.

7. The control system as claimed in claim 6, wherein the navigation system is designed for navigation exclusively on a basis of the navigation map data.

8. The control system as claimed in claim 6, wherein the navigation system is designed to enhance or update the navigation map data on the basis of the update data.

9. The control system as claimed claim 6, wherein the first controller or at least the navigation system is designed to perform map matching and to ascertain a possible location area for the vehicle on the basis of an evaluation of a travel history.

10. The control system as claimed in claim 9, wherein the first controller or at least the navigation system is designed to ascertain a local location probability for the vehicle on the basis of the possible location area and to subsequently supplement a location information item.

11. The control system as claimed in claim 10, wherein the location information item is supplemented in the form of textual meta data.

12. The control system as claimed in claim 9, wherein the first controller or at least the navigation system is designed to transmit data for the location area or for the local location probability to a control center or to an advanced driver assistance system, even if explicit association with a permitted position on a navigation map is not possible.

13. The control system as claimed in claim 12, wherein the data transmitted to the control center or to the advanced driver assistance system contains information about a plurality of possible positions of the vehicle.

14. The control system as claimed in claim 13, wherein the information about the plurality of possible positions of the vehicle contains a statement indicating a location probability.

15. A method for updating a navigation map in a vehicle, said method comprising the following steps:
   storing, by a first processor of a first controller in the vehicle, navigation map data in a first storage memory device;
   controlling, by the first controller, a navigation monitor for displaying information to a driver of the vehicle;
   storing, by a second processor of a second controller connected to a vehicle data bus in the vehicle, update data in a second storage memory device separate from the navigation map data stored in the first storage memory device;
   receiving, by the second processor of the second controller, navigation map data transmitted from the first processor of the first controller;
   generating, by the second processor of the second controller, updated navigation map data based on the navigation map data received from the first processor of the first controller and the update data stored in the second storage memory device;
   storing, by the second processor of the second controller, the updated navigation map data separately from the navigation map data; and
   transmitting, by the second processor of the second controller, the stored updated navigation map data to:
      1) a driver assistance system connected to the vehicle data bus and physically separate from the navigation monitor, where the updated navigation map data is used by the driver assistance system to control at least one of antilock braking system (ABS), electronic stability program (ESP), traction control system (TCS) and electronic differential lock (EDL), and
      2) the navigation monitor via the first controller.

16. The method as claimed in claim 15,
   wherein the first controller is in the form of a navigation system for the vehicle or is at least coupled to a navigation system for the vehicle; and
   wherein the second controller is in the form of a driver assistance system or is at least coupled to a driver assistance system.

17. The method as claimed in claim 15 further comprising the steps of:
   performing map matching;
   ascertaining a possible location area for the vehicle on a basis of an evaluation of a travel history by the first controller or at least the navigation system.

18. A computer program product which, when executed on a processor in a vehicle, instructs the processor to perform the following steps:

storing, by a first processor of a first controller in the vehicle, navigation map data in a first storage memory device;

controlling, by the first controller, a navigation monitor for displaying information to a driver of the vehicle;

storing, by a second processor of a second controller connected to a vehicle data bus in the vehicle, update data in a second storage memory device separately from the navigation map data stored in the first storage memory device;

receiving, by the second processor of the second controller, navigation map data transmitted from the first processor of the first controller;

generating, by the second processor of the second controller, updated navigation map data based on the navigation map data received from the first processor of the first controller and the update data stored in the second storage memory device;

storing, by the second processor of the second controller, the updated navigation map data separately from the navigation map data; and transmitting, by the second processor of the second controller, the stored updated navigation map data to:
1) a driver assistance system connected to the vehicle data bus and physically separate from the navigation monitor, where the updated navigation map data is used by the driver assistance system to control at least one of antilock braking system (ABS), electronic stability program (ESP), traction control system (TCS) and electronic differential lock (EDL), and
2) the navigation monitor via the first controller.

19. A non-transitory computer-readable medium which stores a computer program product which, when executed on a processor in a vehicle, instructs the processor to perform the following steps:

storing, by a first processor of a first controller in the vehicle, navigation map data in a first storage memory device;

controlling, by the first controller, a navigation monitor for displaying information to a driver of the vehicle;

storing, by a second processor of a second controller connected to a vehicle data bus in the vehicle, update data in a second storage memory device separately from the navigation map data stored in the first storage memory device;

receiving, by the second processor of the second controller, navigation map data transmitted from the first processor of the first controller;

generating, by the second processor of the second controller, updated navigation map data based on the navigation map data received from the first processor of the first controller and the update data stored in the second storage memory device;

storing, by the second processor of the second controller, the updated navigation map data separately from the navigation map data; and transmitting, by the second processor of the second controller, the stored updated navigation map data to:
1) a driver assistance system connected to the vehicle data bus and physically separate from the navigation monitor, where the updated navigation map data is used by the driver assistance system to control at least one of antilock braking system (ABS), electronic stability program (ESP), traction control system (TCS) and electronic differential lock (EDL), and
2) the navigation monitor via the first controller.

* * * * *